US008800733B2

(12) United States Patent
Pasino

(10) Patent No.: US 8,800,733 B2
(45) Date of Patent: Aug. 12, 2014

(54) GUIDING AND SEALING UNIT, IN PARTICULAR FOR A ROD OF A MONO-TUBE SHOCK ABSORBER AND ANNULAR SEALING ASSEMBLY THEREFORE

(75) Inventor: Roberto Pasino, Castellero (IT)

(73) Assignee: Aktiebolaget SKF, Gothenburg (SE)

( * ) Notice: Subject to any disclaimer, the term of this patent is extended or adjusted under 35 U.S.C. 154(b) by 159 days.

(21) Appl. No.: 13/204,048

(22) Filed: Aug. 5, 2011

(65) Prior Publication Data

US 2012/0199431 A1 Aug. 9, 2012

(30) Foreign Application Priority Data

Aug. 9, 2010 (IT) ................ TO2010A0690

(51) Int. Cl.
*F16F 9/36* (2006.01)
(52) U.S. Cl.
USPC ............ 188/322.16; 188/322.17; 92/168; 277/572; 277/549
(58) Field of Classification Search
CPC ............ F16F 9/36; F16F 9/362; F16F 9/363; F16F 9/585
USPC ........ 188/322.17, 322.16; 277/436–439, 551, 277/569, 572, 500, 549; 92/165 R, 168
See application file for complete search history.

(56) References Cited

U.S. PATENT DOCUMENTS 4,055,352 A * 10/1977 Allinquant et al. .......... 277/558
5,167,419 A * 12/1992 Robertson .................... 277/552
5,664,651 A * 9/1997 Miura et al. ............. 188/322.17
5,839,551 A * 11/1998 Cesaraccio et al. ...... 188/322.17
6,253,661 B1 * 7/2001 Fenn et al. ................. 92/165 R
6,612,582 B2 * 9/2003 Hosoda ......................... 277/436
6,659,470 B2 * 12/2003 Hosoda et al. ............... 277/560
8,127,902 B2 * 3/2012 Pasino ..................... 188/322.17
2002/0079650 A1 * 6/2002 Hosoda ......................... 277/549
2002/0092722 A1 * 7/2002 Hosoda et al. ........... 188/322.17
2008/0221839 A1 * 9/2008 Pasino ............................ 703/1
2008/0314707 A1 * 12/2008 Lun ............................... 188/297
2012/0063707 A1 * 3/2012 Pasino ............................ 384/16

FOREIGN PATENT DOCUMENTS

| DE | 8201327 U1 | 5/1982 | |
| DE | 4432305 A1 | 3/1996 | |
| EP | 1074760 A2 * | 2/2001 | ............... F16F 9/36 |
| EP | 1291547 A2 | 3/2003 | |
| EP | 1939485 A1 | 7/2008 | |
| EP | 2006569 A2 | 12/2008 | |

* cited by examiner

*Primary Examiner* — Thomas Irvin
(74) *Attorney, Agent, or Firm* — Bryan Peckjian; SKF USA Inc. Patent Department

(57) ABSTRACT

A guiding and sealing unit for a shock absorber rod including a bushing and a sealing assembly, integrally carried by an end of the bushing, and including a sealing ring made of elastomeric material having at least one annular sealing lip which radially and overhangingly protrudes towards a symmetry axis, and a metallic reinforcing structure, having a flange-shaped portion that abuts the end of the bushing and a sleeve-shaped portion operatively associated to the sealing lip; the sealing ring has a flange-shaped portion which radially extends from a root portion of the at least one annular lip, and an annular projection integrally formed with the flange-shaped portion, which axially and protrudingly extends from the latter, facing the piston and shaped to make, a limit stop element for the piston; the flange-shaped portion of the reinforcing structure is coupled to the flange-shaped portion and extends under the annular projection.

10 Claims, 3 Drawing Sheets

GUIDING AND SEALING UNIT, IN PARTICULAR FOR A ROD OF A MONO-TUBE SHOCK ABSORBER AND ANNULAR SEALING ASSEMBLY THEREFORE

CROSS REFERENCE

This application claims priority to Italian Patent Application No. TO2010A000690 filed on Aug. 9, 2010, the contents of which are fully incorporated herein by reference.

BACKGROUND OF THE INVENTION

The present invention relates to a guiding and sealing unit for a mono-tube shock absorber rod and to an annular sealing assembly incorporated within.

Hydraulic shock absorbers of the mono-tube type, extensively used in the automotive and other industries, are intended to work under relatively high hydraulic pressures, in average about 20 bars, with peaks which may reach 100 bars. In view of such high working pressures, the sealing of the pressurized oil contained in the shock absorber, acts against the reciprocating motion of the piston body.

The sealing of pressurized oil contained in the shock absorber body contrasts in application to the reciprocating motion of the piston in the body itself, and the guiding of the shock absorber rod are made by means of a guiding and sealing unit having a bushing thoroughly engaged by the rod, wherein the bushing is then fluid-tightly mounted within the body of the shock absorber, and a sealing assembly carried by the bushing, of the type described in German utility model patent application DE8201327U.

This sealing assembly of the prior art contemplates numerous elements to be mounted separately, and is thus relatively cumbersome and complex to be assembled. The situation is made additionally worse because other component elements are needed for correct operation of the shock absorber, e.g. a static seal between shock absorber body and bushing, and a limit stop element for the piston, which allows a "smooth" stop, without sudden impacts which could produce undesired noises and, in the severest cases, possible damage. Such a limit stop element is an additional, but necessary element, which is very difficult to mount and which, above all, increases dimensions in axial sense.

European patent application EP-A-06425875 discloses a sealing assembly for shock absorber rods and a guiding unit therein which the static seal is integrated with the sealing assembly provided with the dynamic sealing lip or lips towards the shock absorber rod. However, such a solution does not solve the assembly problem of the limit stop element for the piston, and may be relatively expensive to be produced, because the "static" part of the seal is produced with the same high performance elastomeric mix which is used to produce the sealing lip.

It is the object of the present invention to provide a guiding and sealing unit for a rod of a mono-tube shock absorber and a sealing assembly therein, which are free from the drawbacks of the prior art and which, in particular, are suitable for application on shock absorbers of the mono-tube type, which allow to drastically simplify the assembly of the limit stop element of the piston and which allows to reduce the length and the weight of the shock absorber maintaining the same working stroke of the piston, all this preserving the assembly ease of the unit known from EP-A-06425875. It is a further object of the invention to provide a guiding and sealing unit and a sealing assembly for shock absorber rods which are also cost-effective to produce.

SUMMARY OF THE INVENTION

According to a first embodiment of the present invention, a guiding and sealing unit for a mono-tube shock absorber rod, as defined in claim 1.

According to a second embodiment of the present invention, a sealing assembly for such a guiding and sealing unit is further provided, as defined in claim 8.

The invention allows to easy integration of a traditional limit stop element for the piston with both the static seal needed by the bushing, and, above all, with the lip or lips for dynamic sealing on the shock absorber rod, forming the three elements in a single "integrated" sealing assembly, while being able to make the part of the sealing ring which carries the dynamic hydraulic sealing lip or lips with a higher quality material (and thus a material with higher performance) and the rest with a more common material, and thus much less expensive, to maximize performance while reducing production costs at the same time.

The particular geometry adopted in the sealing assembly according to the present invention further allows not only to maintain, but even to improve the performance of the limit stop element, and, above all, to drastically decrease axial dimensions needed to install all the necessary elements on the shock absorber (rod guiding bushing, limit stop element for the piston, dynamic seal for the rod, static seal for the bushing), thus allowing the ability to greatly reduce the dimensions and weight of the mono-tube shock absorbers in use today while maintaining the same working stroke of the piston.

Finally, the guiding and sealing unit according to the present invention can be pre-assembled allowing coupling of the limit stop element to the shock absorber body with a single operation.

This allows a further reduction of costs in addition to a further consistent reduction of the axial dimensions of the unit consisting in the bushing-sealing assembly.

BRIEF DESCRIPTION OF THE SEVERAL VIEWS OF THE DRAWINGS

Further features and advantages of the present invention will be apparent in the description of the following non-limitative embodiment thereof, with reference to the accompanying drawings, in which.

DETAILED DESCRIPTION OF THE INVENTION

Figure 1:
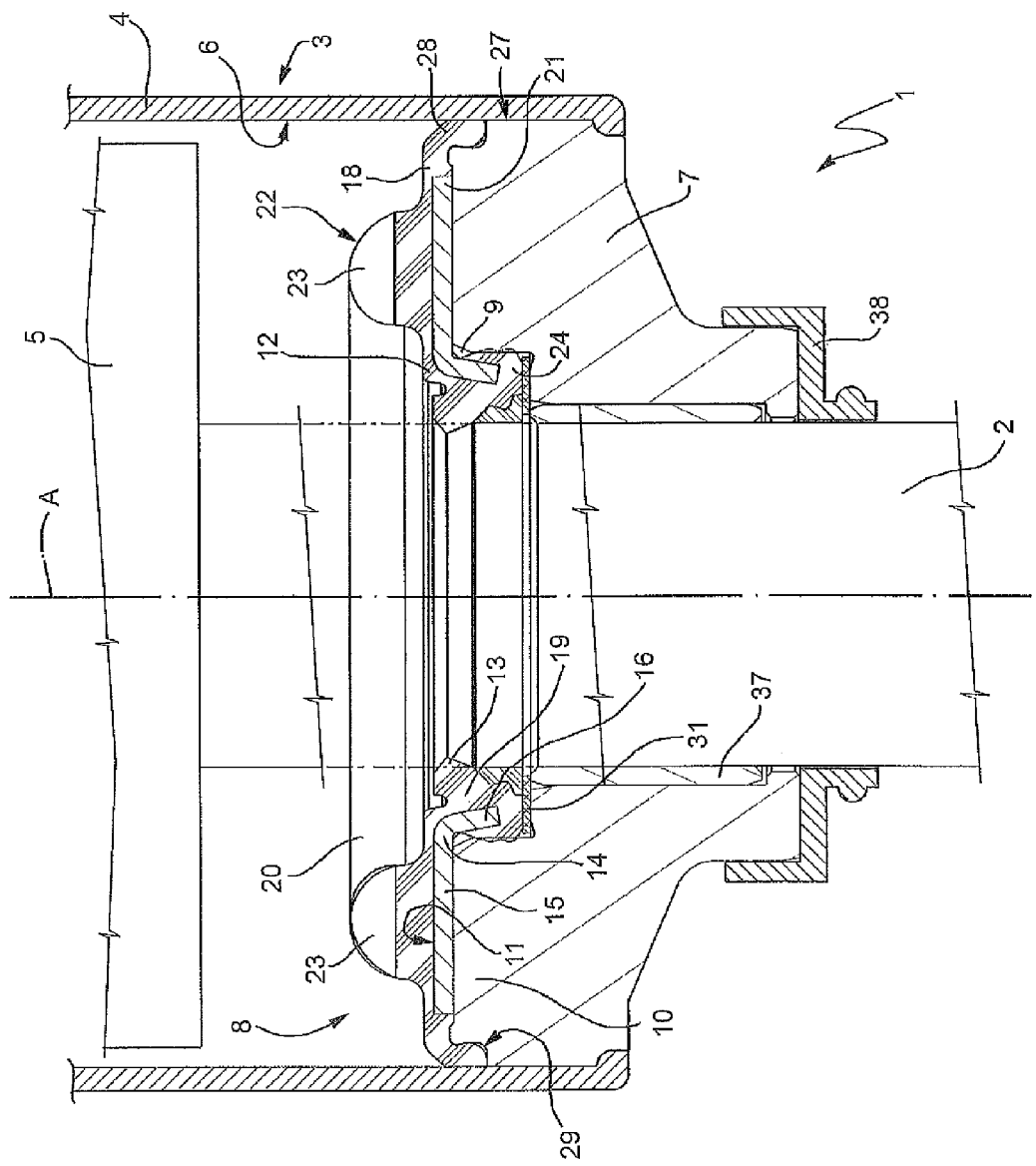
FIG. 1 illustrates, in cross section a first preferred embodiment of a portion of a shock absorber provided with a guiding and sealing unit according to the present invention.

With reference to figures from 1 to 3, numeral 1 indicates as a whole, a guiding and sealing unit 1 for a rod 2 of a mono-tube shock absorber 3, illustrated only in part for the sake of simplicity and known for the rest, having a shock absorber body 4 filled with oil and sealed by a piston 5, which is guided along an inner side wall 6 of the shock absorber body 4, which delimits the same. The unit 1 is fluid-tightly driven onto the wall 6 such as to close an end of the body 4 and has a symmetry axis A coinciding with the symmetry and axial sliding axis of the rod 2.

Unit 1 provides an annular rod guiding bushing 7, which is fluid-tightly fixed in use to the inner lateral wall 6 of the body 4 of the shock absorber 2, and symmetric in use with respect to axis A and extends through and is engaged by the rod 2. Unit 1 includes a sealing assembly 8, that is also symmetric with respect to axis A, and is pressed into a cup-shaped seat 9 formed on a first end 10 of the bushing 7 facing towards the inside of the shock absorber body 4 and thus facing the piston 5. In particular, the seat 9 is frontally made on a face 11 of the end 10 facing towards the inside of the body 4 and the piston 5.

Figure 2:
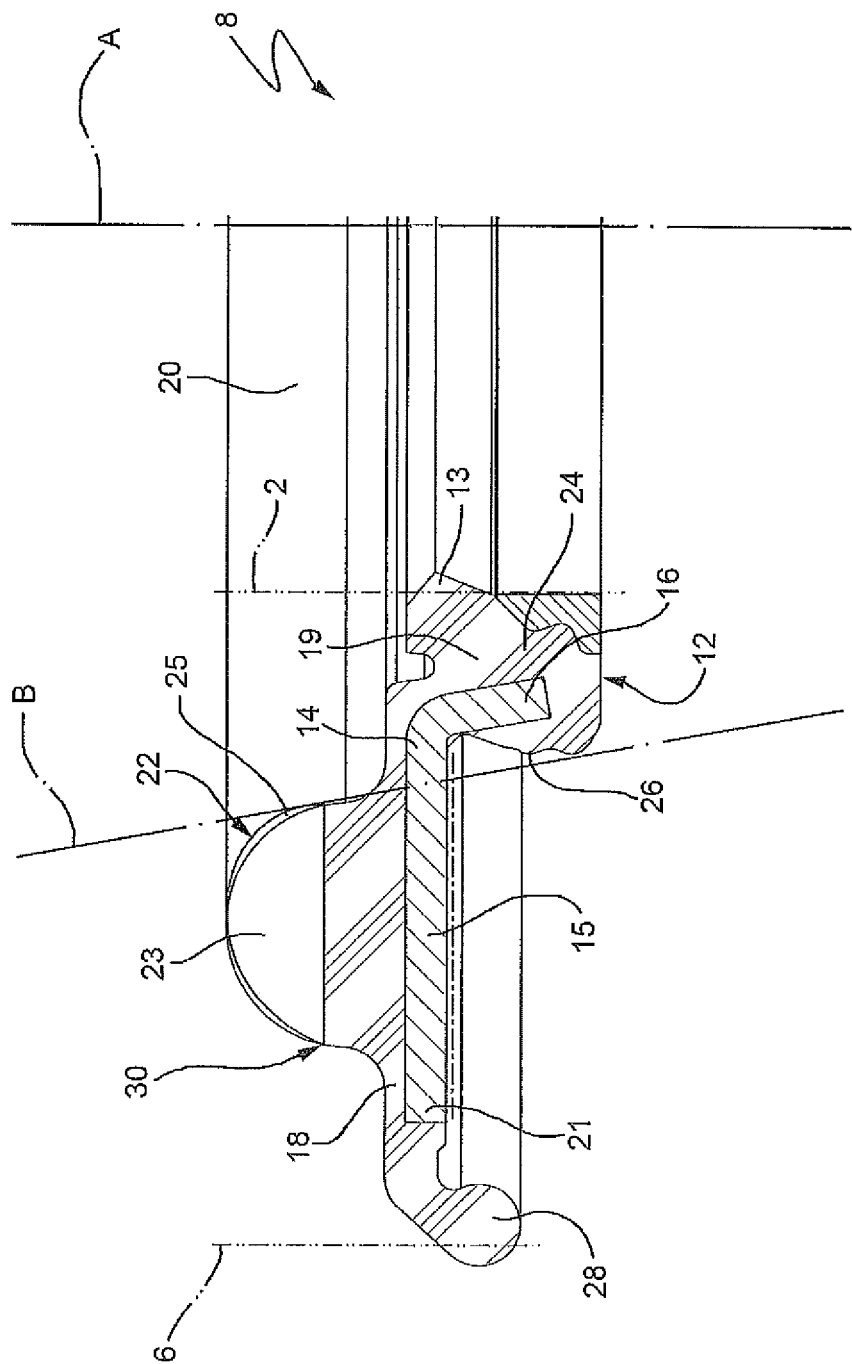
FIG. 2 illustrates, an enlarged cross section of a sealing assembly according to the present invention, as previously presented in FIG. 1.
Figure 3:
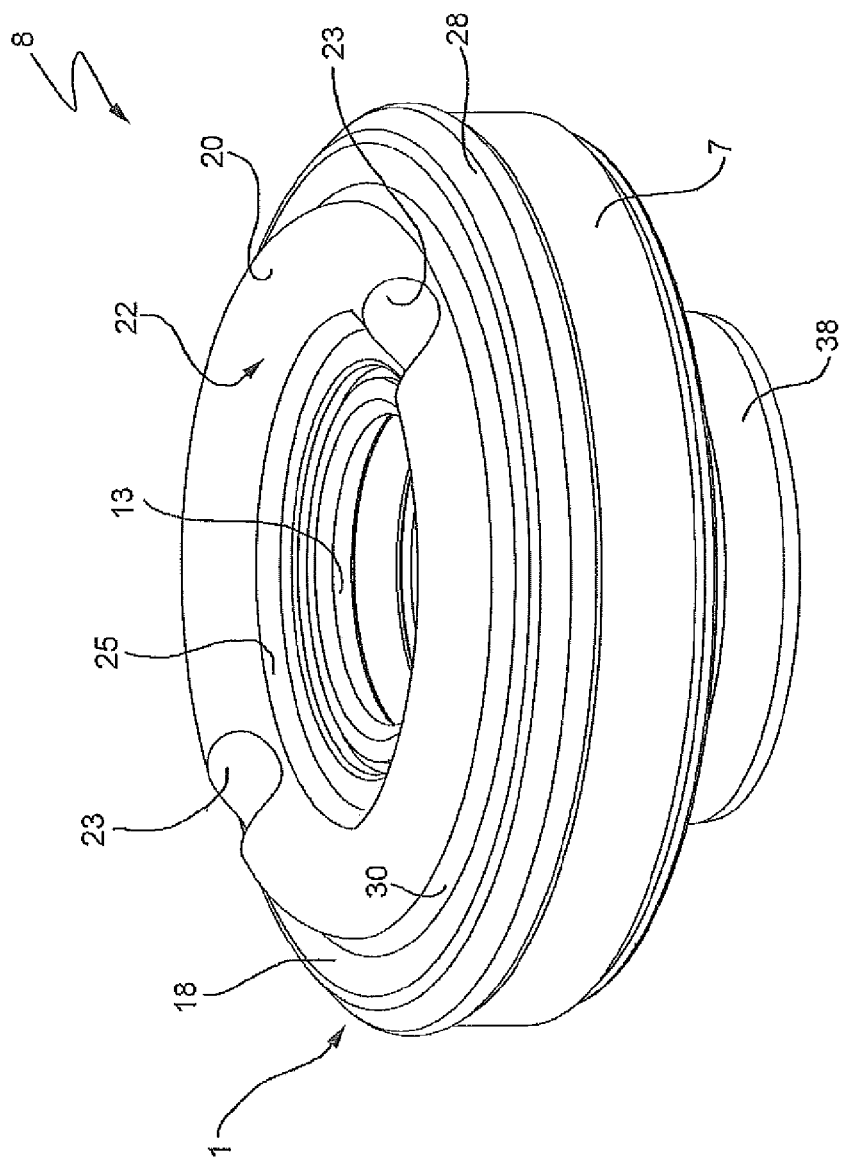
FIG. 3 illustrates a perspective front view of the guiding and sealing assembly according to the present invention, as previously presented in FIG. 2.

The sealing assembly 8 (also see FIGS. 2 and 3) comprises a sealing ring 12 made of elastomeric material having at least one annular sealing lip 13 which radially and overhangingly protrudes towards axis A, which is also the symmetry axis of the sealing ring 12 itself, to cooperate in use with the rod 2 (in known manner and thus not further described) and an annular reinforcing structure 14, e.g. metallic, having a flange-shaped assembly portion 15, abuttingly arranged against the face 11; the latter is defined by an annular surface circumscribing the cup-shaped seat 9. The reinforcing structure 14 further displays a sleeve-shaped portion 16 operatively associated to a sealing lip 13 in known manner, by virtue of the constructive geometry of both.

According to the invention, the sealing ring 12 has, in combination, a flange-shaped portion 18 which radially extends from a root portion 19 of the lip 13 and an annular projection 20 integrally obtained in one piece with the flange-shaped portion 18 and which axially and protrudingly extends from the latter, from the side of the same facing the piston 5 in use; in particular, the flange-shaped portion 15 of the reinforcing structure 14 is mechanically coupled (e.g. by gluing during the step of vulcanization) to the flange-shaped portion 18 of the sealing ring 12, on the side opposite to the annular projection 20 and at least partially embedded in the same.

From the above it is apparent that in order to increase the sealing capacity of the sealing assembly 8 if the circumstances so require, according to an alternate embodiment (not shown for the sake of simplicity) the sealing assembly 8 may be provided with two or more sealing lips 13 arranged in series along axis A and which extend from the root portion 19 towards axis A.

According to an aspect of the invention, the dimensions of the flange-shaped portion 15 are such that it radially extends under the annular projection 20 up to at least circumscribe it with an external peripheral edge 21 thereof, so as to be interposed between the entire annular projection 20 and the end 10 of the bushing 7; the annular projection 20 is, according to the invention, shaped so as to make in use a limit stop element for the piston 5.

For this purpose, the annular projection 20 is, in the illustrated case in point, shaped as a semi-toroidal dome delimited on the side opposite to the second flange-shaped portion 18 of the sealing ring 12 by a cylindrical curved surface 22, on which are obtained, preferably in symmetric angular positions, at least two depressions 23 adapted to define respective radial notches, which interrupt the continuity of the annular projection 20. Such depressions 23 are preferably saddle-shaped, and have the purpose of constituting a relief for the oil which fills the inside of the body 4 when the piston 5 abuts against the bushing 7, with the interposition of the limit stop element defined by the projection 20, in other words, when the piston 5 abuts directly against the projection 20. Also in this case, and according to a possible variant of the sealing assembly 8 (not shown for the sake of simplicity), more than two depressions 23 could be obtained on the annular projection 20, e.g. three or four, which would be in all cases angularly equally spaced apart about axis A.

Preferably, the sealing ring 12 comprises a central portion 24, which has axial dimensions approximately identical to those of the annular projection 20 and is sleeve-shaped so as to couple by interference within the cup-shaped seat 9 to anchor the sealing assembly 8 to the bushing 7.

The sleeve portion 24 of the sealing ring 12 extends axially from the side opposite to the annular lip 13, includes the root portion 19 of the latter and carries embedded therein the sleeve-shaped portion 16 of the reinforcing structure 14. In particular, the sleeve-shaped portion 16 overhangingly extends from a radially inner edge of the flange-shaped portion 15, obliquely to the symmetry axis A and in a direction (FIG. 2) substantially parallel to the tangent line in common to the mutually adjacent opposite flanks 25, 26 of the annular projection 20 and of the sleeve-shaped portion 24 of the sealing ring 12, tangent line which is indicated by a dash-and-dotted line marked by B in FIG. 2.

The projection 20 is dimensioned so as to have the required deformation under the bias of the abutting piston 5. In particular, the height and width, in radial sense of the projection 20 must be such that the design Force-Deformation curve is respected when the piston 5 rests and pushes on the projection 20.

According to another aspect of the invention, the flange-shaped portion 18 of the sealing ring 12 extends radially up to a peripheral outer edge 27 of the first end 10 of the bushing 7, completely covering the face 11 of the same; furthermore, it has a radially outer edge 28 which is frustum-shaped and then thickened on one end thereof with a shape so as to define a static seal of substantially toroidal shape; the edge 28 is adapted in use to fluid-tightly cooperate with the inner lateral wall 6 of the shock absorber 4; it is further snap-mounted within an annular groove 29 (FIG. 1) obtained on the peripheral outer edge 27 of the end 10 of the bushing 7.

In this manner, the sealing ring 12 is restrained to the end 10 of the bushing 7 on both sides 25 and 30, of the annular projection 20, respectively the peripherally innermost and outermost sides thereof with respect to the symmetry axis A.

In order to complete the geometry adapted to optimize performance, the annular projection 20 is obtained so as to extend from the side opposite to the face 11 (i.e. is facing from the opposite part to the face 11) and is obtained in a radial position immediately circumscribing the cup-shaped seat 9 of the first end 10 and thus in position immediately adjacent to, and outside of, the seat 9.

According to a further, non secondary feature of the invention, the sealing ring 12 is integrally made in one piece with at least two different elastomeric compounds; a first compound is used to form at least the sealing lip 13 (or a plurality of lips 13, if present); this first compound is based on an elastomeric material chosen for example from the group consisting of HNMR (hydrogenated nitrile butadiene rubber), FMK (fluoroelastomer, the features of which are defined by ASTM D1418; the code FMK indicates a family of fluoroelastomers which differ from one another in terms of fluoride content and which mainly consist of vinylidene fluoride, with the addition of other components such as tetrafluoroethylene, known as TFE, and hexafluoropropylene, known as HFP).

In combination with the above, at least one second compound is used, different from the first, for forming at least the annular projection 20 and the corresponding flange-shaped portion 18 with which it is integrally obtained; this second compound is, for example, nitrile rubber based.

In order to make these two (or more) compounds become integral in one piece, according to a known method of the Applicant, the parts made of different compounds of the ring 12 are introduced in a same mould in pre-vulcanized or "green" state, along with the reinforcing structure 14 and then compression molded and vulcanized.

Preferably, between the bottom wall of the cup-shaped body 9 and the sealing ring 12 is arranged a flat ring 31 made, in form of a washer, of a relatively rigid synthetic plastic material; the ring 31 extends radially on substantially the entire extension of the bottom wall of the cup-shaped seat 9 and is interposed between the bottom wall and a terminal end of the sleeve-shaped portion 24 of the sealing ring 12, free from the reinforcing structure.

The unit 1 according to the invention may be obviously integrated with the usual accessories, such as a low friction coefficient guiding sleeve 37 for the rod 2, thoroughly inserted through the bushing 7, and a dust hoot 38 mounted externally on the bushing 7, on side opposite to end 10.

The invention claimed is:

1. A guiding and sealing unit for a rod of a mono-tube shock absorber, the unit comprising:
    an annular rod guide bushing fixedly sealed to an inner lateral wall of a body of the mono-tube shock absorber, and wherein,
    the annular rod guide bushing is located around the rod and is engaged with the rod;
    a sealing assembly pressed into a cup-shaped seat formed on a first end of the annular rod guide bushing, facing a piston, and slidingly engaged within the shock absorber body,
    wherein the sealing assembly provides a sealing ring made of an elastomeric material and having an annular sealing lip, which radially and axially protrudes towards an axis of symmetry of the sealing ring to slidingly engage with the rod, and
    a metallic reinforcing structure having a flange-shaped reinforcing structure portion, and a sleeve portion operatively associated to the lip,
    the flange-shaped reinforcing structure portion abuts against a face of the annular rod guide bushing and circumscribes the cup-shaped seat,
    the sealing ring having a flange-shaped sealing ring portion which radially extends from a root portion of the lip,
    an annular projection integrally formed in one piece with the flange-shaped sealing ring portion of the sealing ring and which axially and protrudingly extends from the flange-shaped sealing ring portion from a side thereof which faces the piston, the annular projection forming a portion of the guiding and sealing unit is positioned closer to the piston than any seal between the guiding and sealing unit and the rod, wherein the flange-shaped reinforcing structure portion is coupled to the flange-shaped sealing lip portion, on a side of the sealing lip opposite to the annular projection,
    the flange-shaped reinforcing structure portion is at least partially embedded in the flange-shaped sealing ring portion and radially extends under the annular projection to such an extent that an outer peripheral edge of the flange-shaped reinforcing structure portion at least circumscribes the annular projection such that the flange-shaped reinforcing structure portion is configured and aligned to underlay all of an area of the sealing ring on which the annular projection is located,
    the flange-shaped reinforcing structure portion is interposed between the entire annular projection and the first end of the annular rod guide bushing, and
    wherein the annular projection is shaped to create a limit stop element for the piston.

2. The guide and sealing unit according to claim 1, wherein the flange-shaped sealing ring portion extends radially up to a peripheral outer edge of the first end of the annular rod guide bushing and completely covers the face of the first end of the annular rod guide bushing, and
    the flange-shaped sealing ring portion includes a radially thickened outer edge shaped so as to define a static seal of substantially toroidal shape, adapted to fluid-tightly cooperate with the inner lateral wall of the shock absorber.

3. The guide and sealing unit according to claim 2, wherein the peripheral edge is snappingly mounted within an annular groove integrally formed on the peripheral outer edge of the first end of the annular rod guide bushing, and wherein,
    the sealing ring is fixed to the first end of the annular rod guide bushing on first and second sides of the annular projection respectively, and wherein,
    the first and second sides represent the peripherally innermost and outermost sides of the annular projection with respect to the symmetry axis of the sealing ring.

4. The guide and sealing unit according to claim 1, wherein the annular projection is positioned to immediately circumscribe the cup-shaped seat of the first end of the bushing.

5. The guide and sealing unit according to claim 1, wherein the sealing ring comprises a central portion which is sleeve-shaped and has axial dimensions approximately identical to those of the annular projection, and wherein,
    the central portion is shaped to create an interference fit within the cup-shaped seat on the first end of the bushing and axially extends from the side opposite of the at least one lip, and wherein,
    the central portion includes the root portion of the lip, and wherein,
    the central portion supports the sleeve portion of the reinforcing structure, which overhangingly extends from a radially inner edge of the flange-shaped portion of the reinforcing structure obliquely to the symmetry axis and in a direction substantially parallel to the tangent line in common to the mutually adjacent opposite sides of the annular projection and of the sleeve portion of the sealing ring.

6. The guide and sealing unit according to claim 1, wherein the annular projection is shaped as a semi-toroidal dome, and wherein,
    the annular projection is delimited on the side opposite to the flange-shaped portion by a cylindrical curved surface, formed in symmetric angular positions, and having at least two depressions adapted to define respective radial notches which interrupt the continuity of the annular projection and wherein,
    the depressions are saddle-shaped.

7. The guide and sealing unit according to claim 1, wherein the sealing ring is integrally made in one piece of at least two different elastomeric compounds, comprising:
    a first compound for forming the at least one lip based on an elastomeric material chosen from the group consisting of hydrogenated nitrile butadiene rubber, fluoroelastomer, and
    at least one second compound in combination with the first compound for forming at least the annular projection and the corresponding flange-shaped sealing ring portion based on nitrile rubber.

8. A sealing assembly configured for use with a rod of a mono-tube shock absorber coupled to a piston that slidingly engages a shock absorber body, the sealing assembly comprising:
- a sealing ring made of an elastomeric material and having at least one annular sealing lip which radially and axially protrudes towards an axis of symmetry of the sealing ring and configured to cooperate with the rod, and
- a metallic reinforcing structure having a flange-shaped reinforcing structure portion, and a sleeve portion operatively associated to the lip,
- the sealing ring having a flange-shaped sealing ring portion which radially extends from a root portion of the at least one lip,
- an annular projection integrally formed in one piece with the flange-shaped sealing ring portion of the sealing ring and which axially and protrudingly extends from the flange-shaped sealing ring portion from a side thereof and configured to face the piston, the annular projection forming a portion of the guiding and sealing unit is positioned closer to the piston than any seal between the guiding and sealing unit and the rod and is radially spaced from the sleeve portion of the metallic reinforcing structure,
- wherein the flange-shaped reinforcing structure portion is coupled to the flange-shaped sealing lip portion, on a side of the sealing lip opposite to the annular projection,
- the flange-shaped reinforcing structure portion is at least partially embedded in the flange-shaped sealing ring portion and radially extends under the annular projection to such an extent that an outer peripheral edge of the flange-shaped reinforcing structure portion at least circumscribes the annular projection such that the flange-shaped reinforcing structure portion is configured and aligned to underlay all of an area of the sealing ring on which the annular projection is located, and
- wherein the annular projection is shaped to create a limit stop element for the piston.

9. The sealing assembly according to claim 8, wherein the annular projection is shaped as a semi-toroidal dome delimited on the side opposite to the flange-shaped sealing ring portion by a curved cylindrical surface, and
- at least two depressions formed, preferably in symmetric angular positions, adapted to define respective radial notches, which interrupt the continuity of the annular projection; and wherein,
- the annular projection further includes axial dimensions approximately identical to those of a central portion of the sealing ring, and wherein,
- the central portion is sleeve-shaped and extends axially from the opposite side of the at least one lip, and includes the root portion of the lip and supports the sleeve portion formed therein, which overhangingly extends from a radially inner edge of the first flange-shaped portion, obliquely to the symmetry axis.

10. The guide and sealing unit according to claim 9 wherein the sealing ring is integrally made in one piece of at least two different elastomeric compounds, comprising:
- a first compound for forming the at least one lip based on an elastomeric material chosen from the group consisting of hydrogenated nitrile butadiene rubber, fluoroelastomer, and
- at least one second compound in combination with the first compound for forming at least the annular projection and the corresponding flange-shaped sealing ring portion based on nitrile rubber.

* * * * *